(12) United States Patent
Neff

(10) Patent No.: US 6,745,980 B2
(45) Date of Patent: Jun. 8, 2004

(54) UNBALANCED GYROSCOPIC APPARATUS FOR PRODUCING UNIDIRECTIONAL THRUST

(75) Inventor: Rupert Theodore Neff, Goose Creek, SC (US)

(73) Assignee: Rupert T. Neff, Goose Creek, SC (US)

(*) Notice: Subject to any disclaimer, the term of this patent is extended or adjusted under 35 U.S.C. 154(b) by 262 days.

(21) Appl. No.: 10/176,259

(22) Filed: Jun. 20, 2002

(65) Prior Publication Data

US 2003/0234318 A1 Dec. 25, 2003

(51) Int. Cl.[7] .............................................. B64C 27/00
(52) U.S. Cl. ...................... 244/62; 244/53 R; 74/84 R; 74/845
(58) Field of Search ............................. 244/62, 53 R; 74/84 R, 845

(56) References Cited

U.S. PATENT DOCUMENTS

| | | | | |
|---|---|---|---|---|
| 3,998,107 A | * | 12/1976 | Cuff | 74/84 S |
| 5,473,957 A | * | 12/1995 | Navarro | 74/84 R |
| 5,557,988 A | * | 9/1996 | Claxton | 74/84 S |
| 5,673,872 A | * | 10/1997 | Shimshi | 244/62 |
| 5,890,400 A | * | 4/1999 | Oades | 74/84 S |
| 6,345,789 B1 | | 2/2002 | Rasmusson | |
| 6,347,766 B1 | | 2/2002 | Woodward | |

* cited by examiner

Primary Examiner—J. Woodrow Eldred

(57) ABSTRACT

An unbalanced gyroscopic apparatus is disclosed for producing unidirectional thrust without having to interact with an external gas, liquid, or solid mass. The technique is based on the controlled transitions of an unbalanced spinning mass between two stable unbalanced weight states resulting in a net unidirectional thrust at the spin axis. In one existing embodiment, an apparatus with an attached body can be propelled up a planar incline "sliding" uphill against terrestrial gravity. In another embodiment, multiple pairs of synchronized and mirror-image, unbalanced gyroscopic assemblies are combined as one apparatus and attached to a body with the potential to propel it in any direction, including defeating gravity completely without interaction with gas, liquid, or solid mass or without use of propellants.

15 Claims, 16 Drawing Sheets

UNBALANCED GYROSCOPIC APPARATUS FOR PRODUCING UNIDIRECTIONAL THRUST

REFERENCES CITED

U.S. Patent Documents

U.S. Pat. No. 6,347,766 Feb. 19, 2002 Woodward 244/62 244/172

U.S. Pat. No. 6,345,789 Feb. 12, 2002 Rasmusson 244/172

BACKGROUND OF THE INVENTION

1. Field of the Invention

This invention relates generally to propulsion and specifically to the use of an unbalanced gyroscopic apparatus to produce unidirectional thrust without interaction with gas, liquid, or solid mass and without the use of propellants.

2. Description of Prior Art

Physics of a rotational gyroscopic system. This invention is based on the general known parameters of a spinning gyroscopic system. Whether a one-inch radius toy or a precision navigation gyroscope, the gyroscopic system commonly employs a perfectly balanced spinning mass centered on a spin axis. In this case, a balanced spinning mass experiences a centrifugal force outward in line with the radius of the spinning mass about the spin axis. Centrifugal force on a spinning mass is a well-established quantitative parameter. An element of mass m at radius R on a spinning gyroscopic system rotating at an angular velocity of omega= $2*Pi*$revolutions per second experiences a centrifugal force $F=m*omega^2*R$ directed outward in line with a diameter of the spinning mass spin plane.

This force F is present on every mass element in the contiguous spinning gyroscopic system. In a balanced spinning system, the sum of these forces is zero, creating a stable spinning plane and axis system appearing static. If a mass notch is removed from the rim at radius R in this balanced spinning gyroscopic system, an unbalanced spinning system results and a visible wobble of the spin axis is perceived. The net movement of the axis over 360 degrees of rotation is still zero for the contiguous gyroscopic system that is unbalanced.

An unbalanced gyroscopic configuration related to this invention is a case where two equal weights are attached to each other at a distance greater than R and less than the diameter of the spin plane oriented on the diameter with the spin axis between them. If this weight pair is further attached to the spin plane and allowed to slide along the diameter freely, two stable unbalanced weight states are possible when initiating rotation of the spin plane and weights. The first weight can be at the rim defining a first stable unbalanced weight state or the second weight can be at the rim defining a second stable unbalanced weight state. In either case the net unbalanced centrifugal force on the spinning axis is $F=m*omega^2*(Rr-Ra)$ where Rr is the radius to the rim mass and Ra is the radius to the axis mass. This condition is stable after rotation startup and will not change naturally resulting in an expected axis wobble similar to the case of the mass notch removal. This configuration alone will not result in a net thrust of the gyroscopic spin axis over a 360-degree rotation period.

However, a laboratory model has been constructed with the two stable unbalanced weight states as described using a pair of weights, each 0.2 ounces, attached to each other and to a one-inch radius spin plane such that they can slide along the spin-plane diameter. A non-rotating change-state cam was added to a fixed tube about the axis to force the weight pair to change from the first stable unbalanced weight state to the second stable unbalanced weight state every 180 degrees of spin-plane rotation. This model rotating at eight revolutions per second demonstrated a series of unidirectional thrust pulses during each 180 degrees of rotation in the quantities of the centrifugal force $F=m*omega^2*(Rr-Ra)$ sufficient to slide a ten-ounce unbalanced gyroscopic apparatus up an incline plane against gravity. Audio recording evidence of the periodic change from the first stable unbalanced weight state to the second stable unbalanced weight state every 180 degrees in this model is incorporated herein as a part of the drawing figures.

Problems With Existing Action Reaction Propulsion. On Earth, the action/reaction propellant-burning engines and air-breathing jet engines interact with the local gas, liquid, or solid mass to produce a reaction thrust. In space, fuel to create mass based action/reaction thrust must be carried with each space vehicle to maintain its position in orbit. Limited fuel capacity dictates that space-borne bodies must be constrained to the long-range orbits and velocities that are consistent with the local gravity environment. These orbits require very large power transmitters to send TV and data from long-range, synchronous orbit satellites. Low-altitude satellite orbits are in use, but the satellites are fast moving and require complex relay and switching systems to achieve gapless data and voice exchanges.

Space Vehicle Problems. The recoverable Space Shuttle is limited to direct launch of low-orbit space vehicles, and requires costly expenditures of fuel, special launch facilities, and personnel resources to launch satellites, repair satellites, and maintain space stations. High risks are always present during launch, and high-speed, powerless returns to Earth require costly participation by large, cooperative global control tracking stations for success.

Space-based Communications and Navigation System Problems. Long-range synchronous orbit satellites require additional satellite fuel for maneuvering to attain the near-circular orbits to maintain a fixed Longitude over the Earth's surface. The transmission ranges of synchronous orbit satellites are also not practical for voice telephone traffic due to long delays between transmit and receive exchanges. High-altitude, 12-hour orbit satellites, such as the Global Positioning System (GPS) for navigation, require complex modeling of rapidly changing ionosphere delays that cause degradation in ranging accuracies that limit precision to 300 feet instead of the few inches possible with sub-ionosphere altitude satellites.

Terrestrial Transportation Problems. Both surface and air traffic densities are extreme due to the constraints imposed by the airlift-dependent aircraft and the road-bound automobile. The Earth's natural resources are being stressed with the employment of oil products with inefficient propulsion devices. Airports to support forward flying air dependent aircraft are extremely inefficient considering that the direct path from home A to home or city B requires travel to/from airports at locations C and D, and usually routing via location E.

Large Space System Problems. Space-borne gyroscopic systems, such as space stations, asteroids, moons, and planets, are beyond our capability to move or propel in space because mass propellant weights are not practical. Isaac Newton stated the problem well when he said "If you give me a place to stand I can move the earth". There is no place to stand and conventional thrust methods are not currently practical.

SUMMARY

The present invention is a technique for employing an unbalanced gyroscopic apparatus with two stable unbalanced weight states wherein a forced change from the first stable unbalanced weight state to the second stable unbalanced weight state every 180 degrees of rotation produces a unidirectional thrust at the gyroscopic spin axis.

OBJECTS AND ADVANTAGES

Accordingly, several objects and advantages of the present invention are:

(a) to provide an unbalanced gyroscopic apparatus to produce unidirectional thrust using only a rotating apparatus powered by standard electric rotational power sources;

(b) to provide an unbalanced gyroscopic apparatus to produce unidirectional thrust using a rotating gyroscopic apparatus with control of changing stable unbalanced weight states every 180 degrees of rotation; and (c) to provide an unbalanced gyroscopic apparatus to produce unidirectional thrust without interacting with terrestrial gas, liquid, or solid mass or explosive action/reaction propellants;

Further objects and advantages are to provide unidirectional thrust to an attached body with only an attached, unbalanced gyroscopic apparatus to move it in any direction including forward, reverse, right, left, up, and down or to provide rotation about any axis without interacting with terrestrial gas, liquid, or solid mass. This obviates the need for vehicles to have wheels or wings to transport persons or things across the terrestrial surface or airways, or to transport objects into space, or to maintain an object at a location above ground, or to reach and sustain an orbit location around any mass gravity object in space. This further provides a means of transporting persons and objects directly from homes and factories to any location in the terrestrial or space environments without launch facilities or airports.

DRAWING FIGURES

FIG. 1 contains drawings of embodiment 1 with all elements assembled with two weights centered on the spin-plane diameter, but located on opposite sides of the spin axis in the stable unbalanced weight state.

FIGS. 2A to 2D contain drawings of embodiment 1 spin axis, spin-plane element, and weight-pair element with time snapshots of weight states during one 180-degree rotation period.

FIG. 3 contains drawings of two embodiment 1 assemblies in one frame configured to synchronously counter-rotate to form the embodiment 2 apparatus that produces unidirectional thrust.

FIGS. 4A to 4G contain drawings of a configuration of embodiment 1 apparatus that contains multiple motors, multiple spin-plane elements, multiple weight-pair elements, and multiple change-state elements on a single spin axis and assembly frame element.

Figure 1:
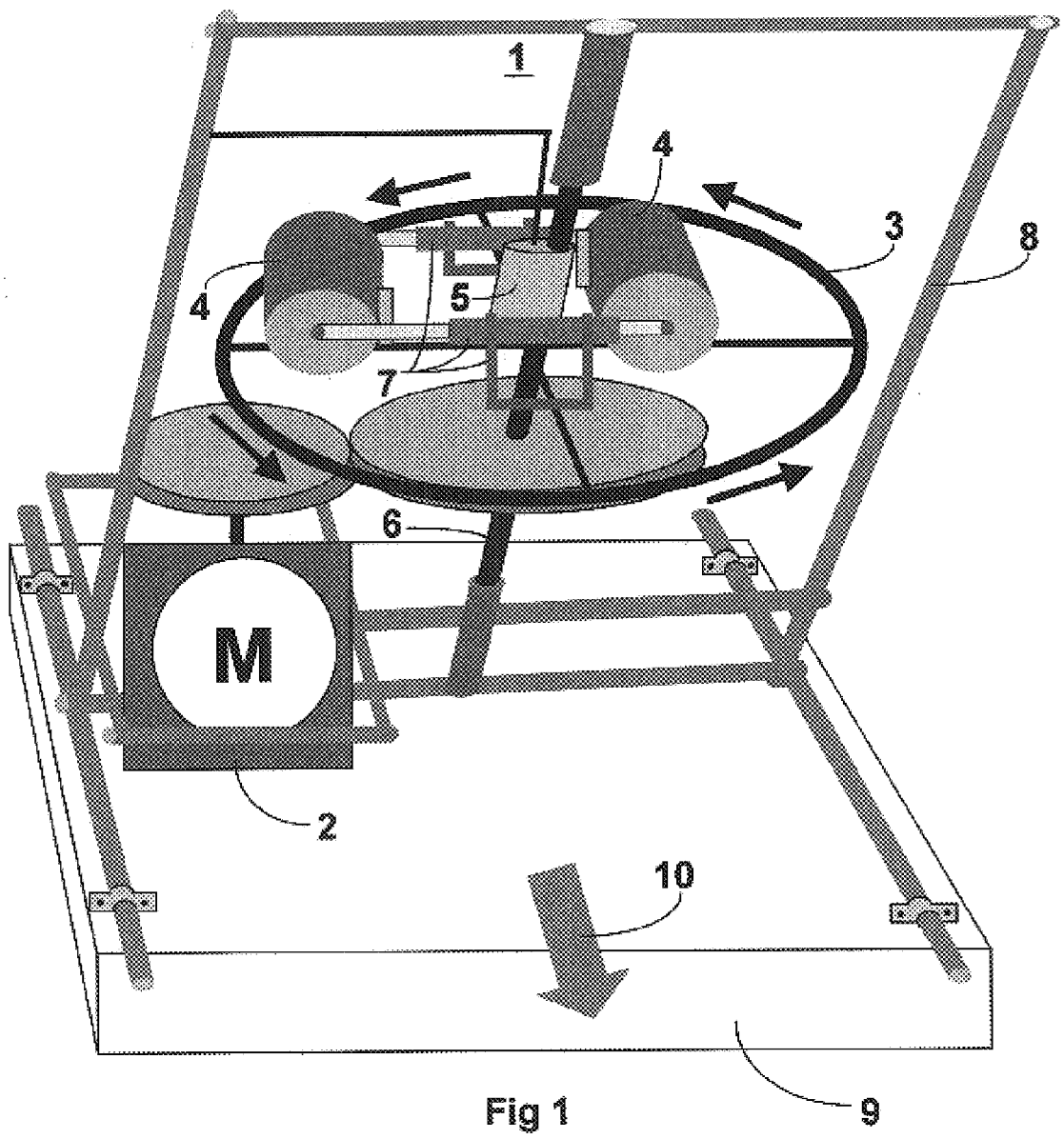

REFERENCE NUMERALS IN DRAWINGS 1 single axis embodiment
2 motor element
3 spin-plane element
4 weight-pair element
5 change-state element
6 spin axis element
7 spin-plane frame element
8 assembly frame element
9 body to receive thrust
10 thrust direction
11 start of change-state action
12 end of change-state action
13 weight free fall period
14 mirror image pair embodiment
15 multiple weight pairs per axis
16 orientation first of six weight pairs
17 orientation second of six weight pairs
18 orientation third of six weight pairs
19 orientation forth of six weight pairs
20 orientation fifth of six weight pairs
21 orientation sixth of six weight pairs
22 passenger vehicle embodiment
23 passenger vehicle passenger compartment
24 vertical thrust direction
25 space station embodiment
26 space station occupied portion
27 space station access areas Description FIGS. 1 and 2A–2D Preferred Embodiment A preferred embodiment of the unbalanced gyroscopic apparatus for producing unidirectional thrust is illustrated in the FIG. 1 overview. The invention incorporates timed control of stable, unbalanced weight states in an unbalanced gyroscopic apparatus changing weight positions slidably along a spin-plane diameter path every 180 degrees of rotation. This action results in a change in momentum of the weights 4 on the spin plane 3 resulting in a reaction thrust of the spin axis 6 in the thrust direction 10. The invention fully assembled 1 and attached to a body 9 to receive thrust is shown in FIG. 1. The elements of the apparatus include: a motor element 2, a spin-plane element 3, a weight-pair element 4, a change-state element 5, a spin axis 6, a spin-plane frame element 7, and an assembly frame element 8. The assembly frame element is attached to a body to receive unidirectional thrust 9 in a thrust direction 10.

In FIGS. 2A–2D, the detail sequence producing unidirectional thrust at the spin axis 6 during 180 degrees of rotation is illustrated. At zero degrees, an audio recording 11 of the initial contact of the cam change-state element 5 marks the initial contact action between the cam change-state element 5 and the weight-pair element 4. In this first segment of 180-degree rotation, the weight-pair element is forced from a first stable unbalanced weight state to a second stable unbalanced weight state. In this period, a momentum change in the weight pair occurs resulting in a reaction thrust of the spin axis in the unidirectional thrust direction 10.

Figure 2A:
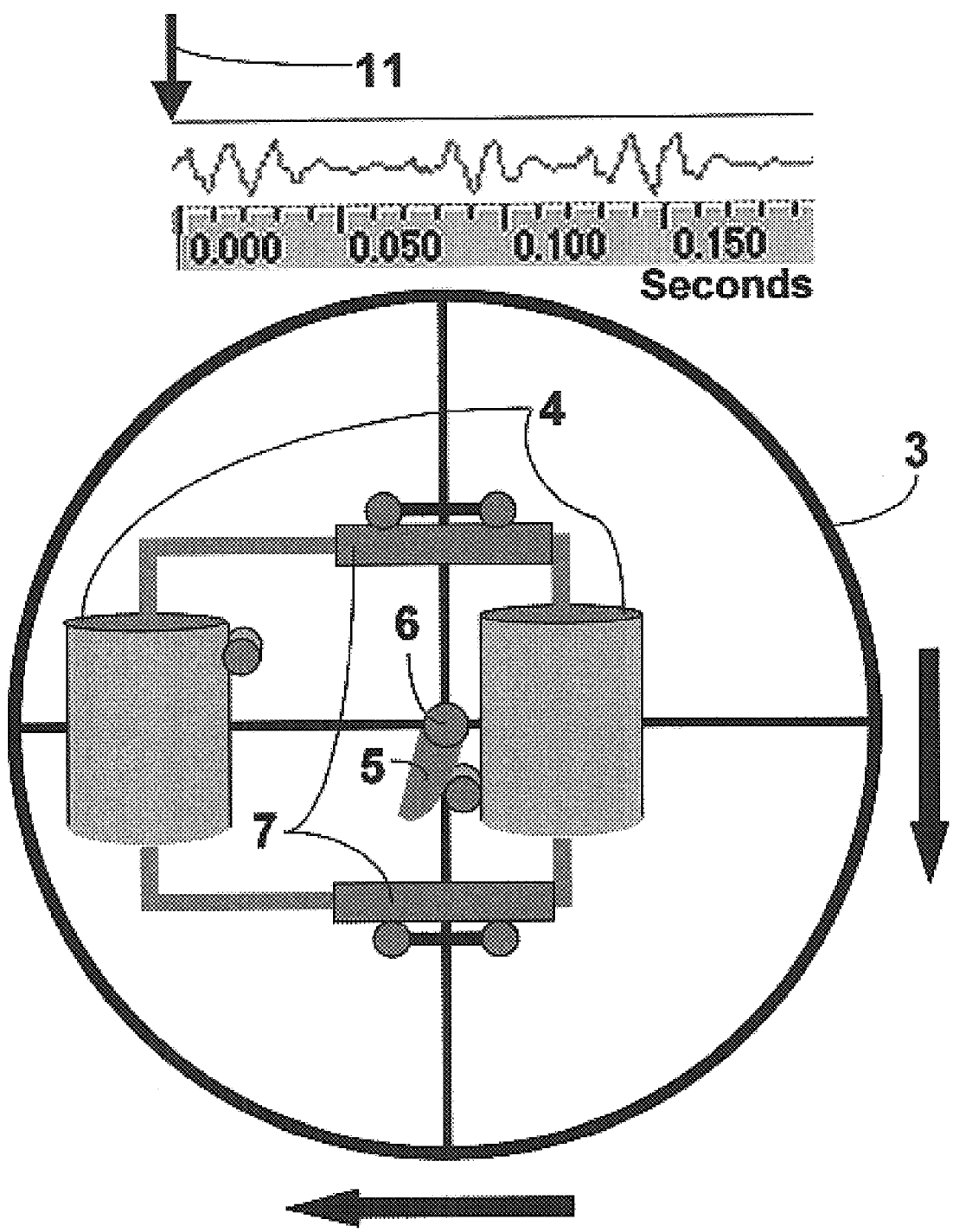
Figure 2B:
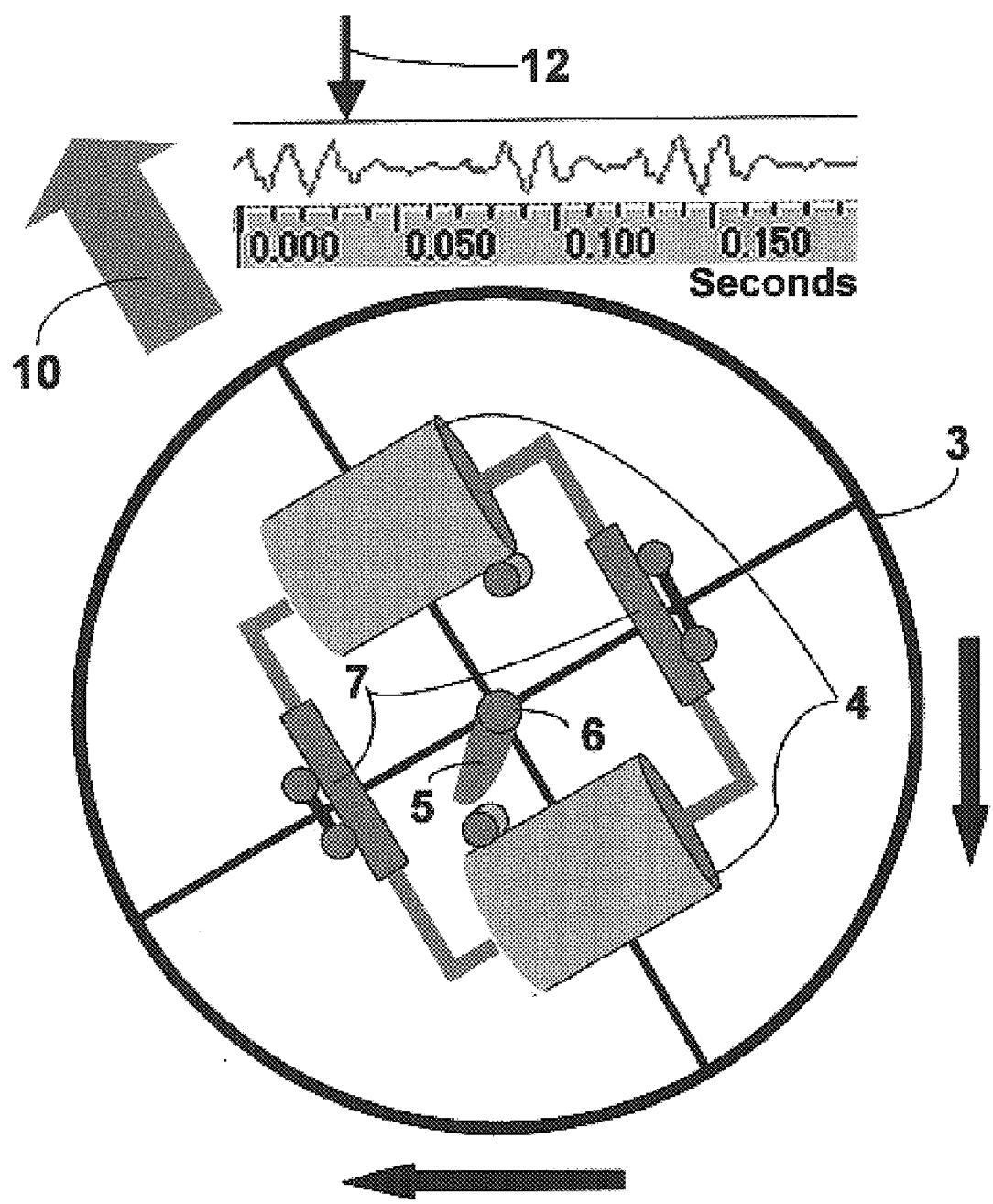

In FIG. 2B, the end of the contact between the cam change-state element 5 and the weight-pair element 4 is illustrated. This is the start of a quiet period in the audio recording of the spinning model 13, marking the weight free-fall period and the start of the second segment of 180-degree rotation.

Figure 2C:
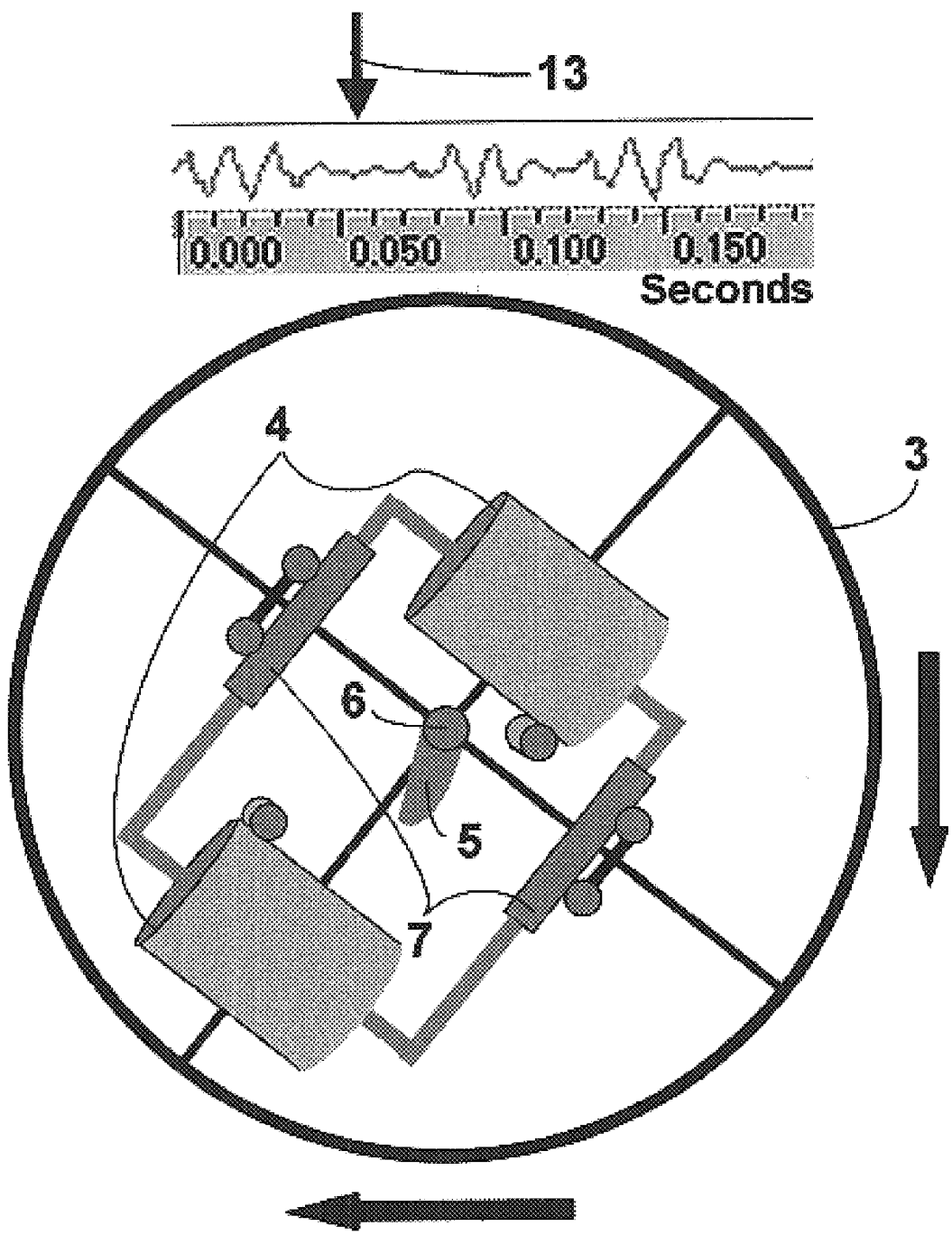
Figure 2D:
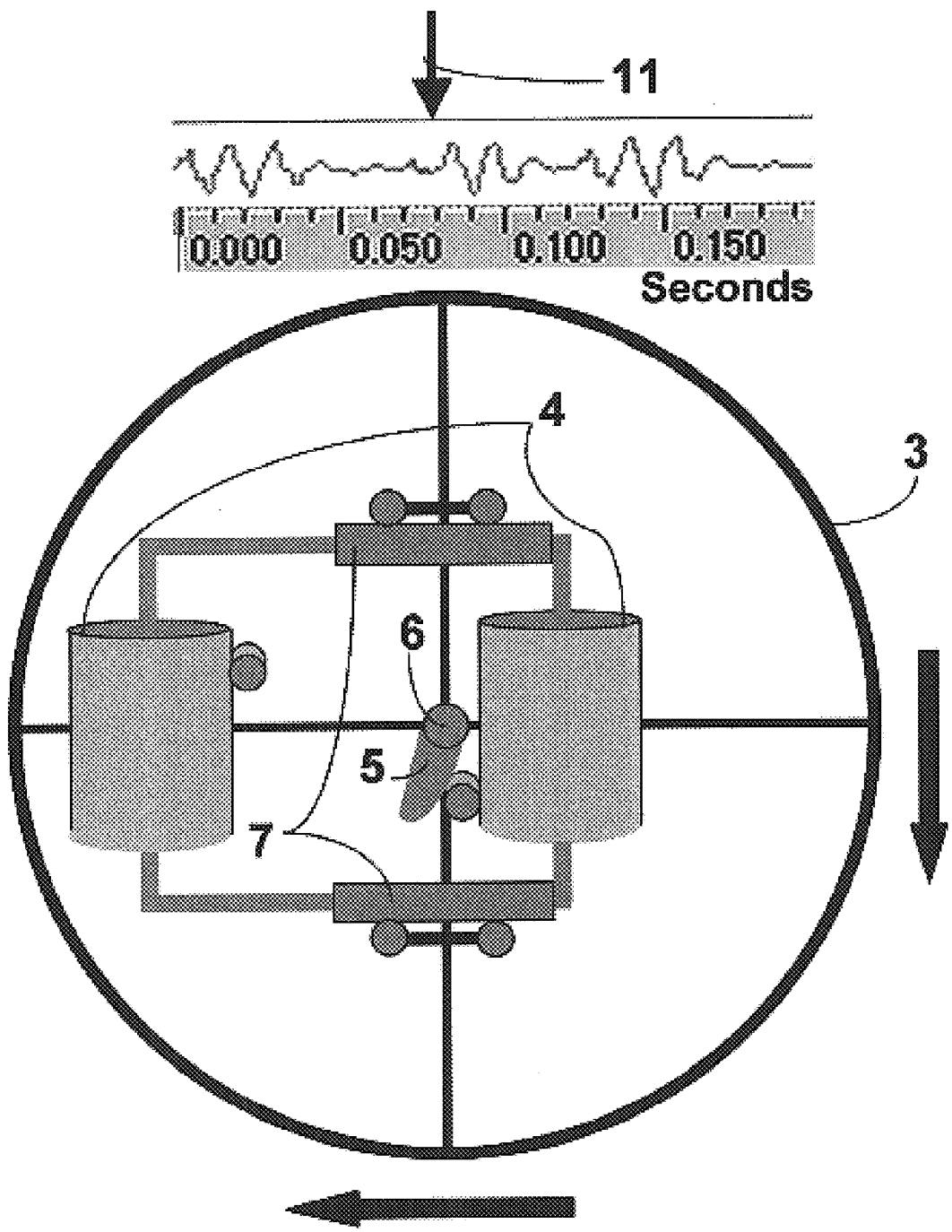

In FIG. 2C, the end of the weight free-fall period is marked by a small noise pulse to the right of the center of the quiet zone 13. This is the stop point of the weight-pair element at the second stable unbalanced weight state, marking the beginning of the last segment of 180 degrees just before the change-state element 5 begins the cycle again in FIG. 2D. This last segment is a brief period of unbalanced centrifugal force present in the second stable unbalanced weight state, resulting in a unidirectional thrust at the spin axis in the same unidirectional thrust direction 10 as experienced during the first segment. The start of the next noise pulse in the audio recording 11 in FIG. 2D begins the start of another 180 degree period.

Figure 3:
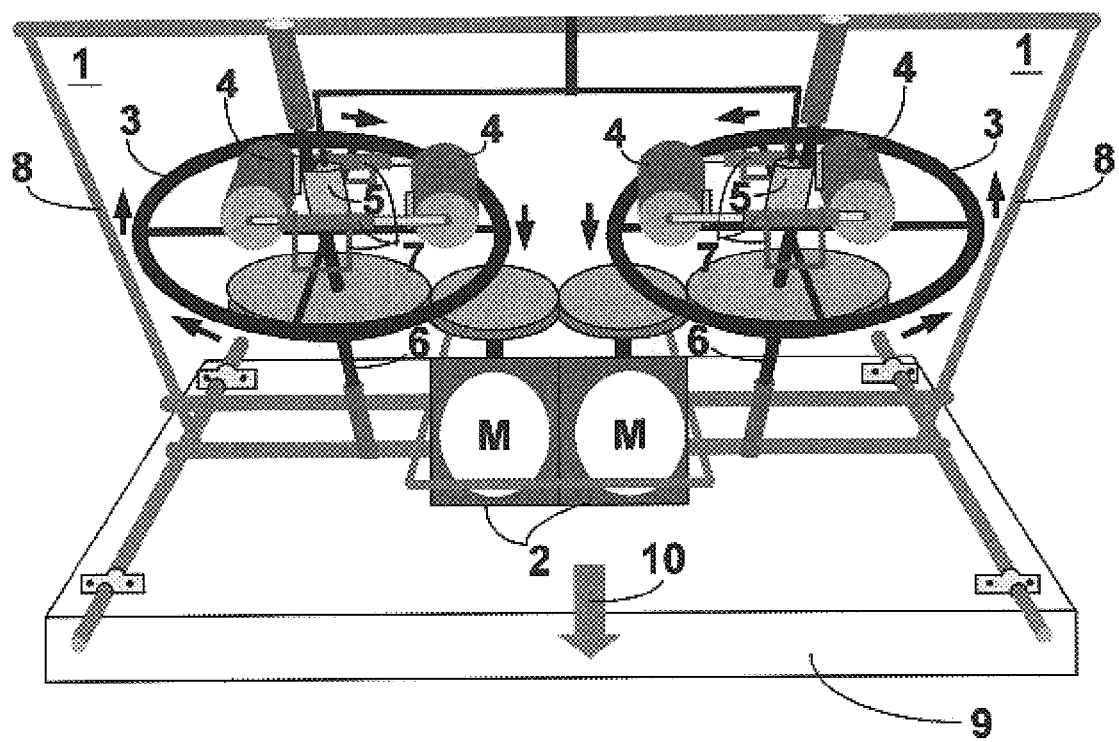

FIG. 3 Additional Embodiments

In FIG. 3, embodiment 2 containing two embodiment 1 assemblies in mirror-image orientation are framed together as one apparatus and synchronized with one spin axis rotating in the opposite direction relative to the second spin axis. The weight-pair elements 4 are oriented to perform the change-state action in both spin planes at a point between the two spin axes 6. The weights on both spin planes are synchronously accelerated backward, causing each axis to thrust forward in the unidirectional thrust direction 10 during the synchronized change-state actions. This action extends through the first segment of the 180 degrees. In the second segment of 180 degrees, the weight pair 4 slidably free falls along the spin-plane diameter toward the second stable, unbalanced weight state. When the weight pair stops movement along the diameter reaching its second stable unbalanced weight state, the third segment of 180 degrees begins. During this segment, an additional unidirectional thrust in the thrust direction 10 is experienced by the spin axis 6 due to the stable unbalanced second weight state in both mirror image spin planes 7.

With matched weight-pair elements 4, all centrifugal, unbalanced forces not aligned in the forward thrust direction 10 are cancelled with the mirror-image orientation and synchronization of the two rotating spin planes 7. The result is a series of thrust pulses in the unidirectional thrust direction 10 during every 180 degrees of rotation of the two spin axes 6.

FIGS. 4A–4G Alternative Embodiments

Figure 4A:
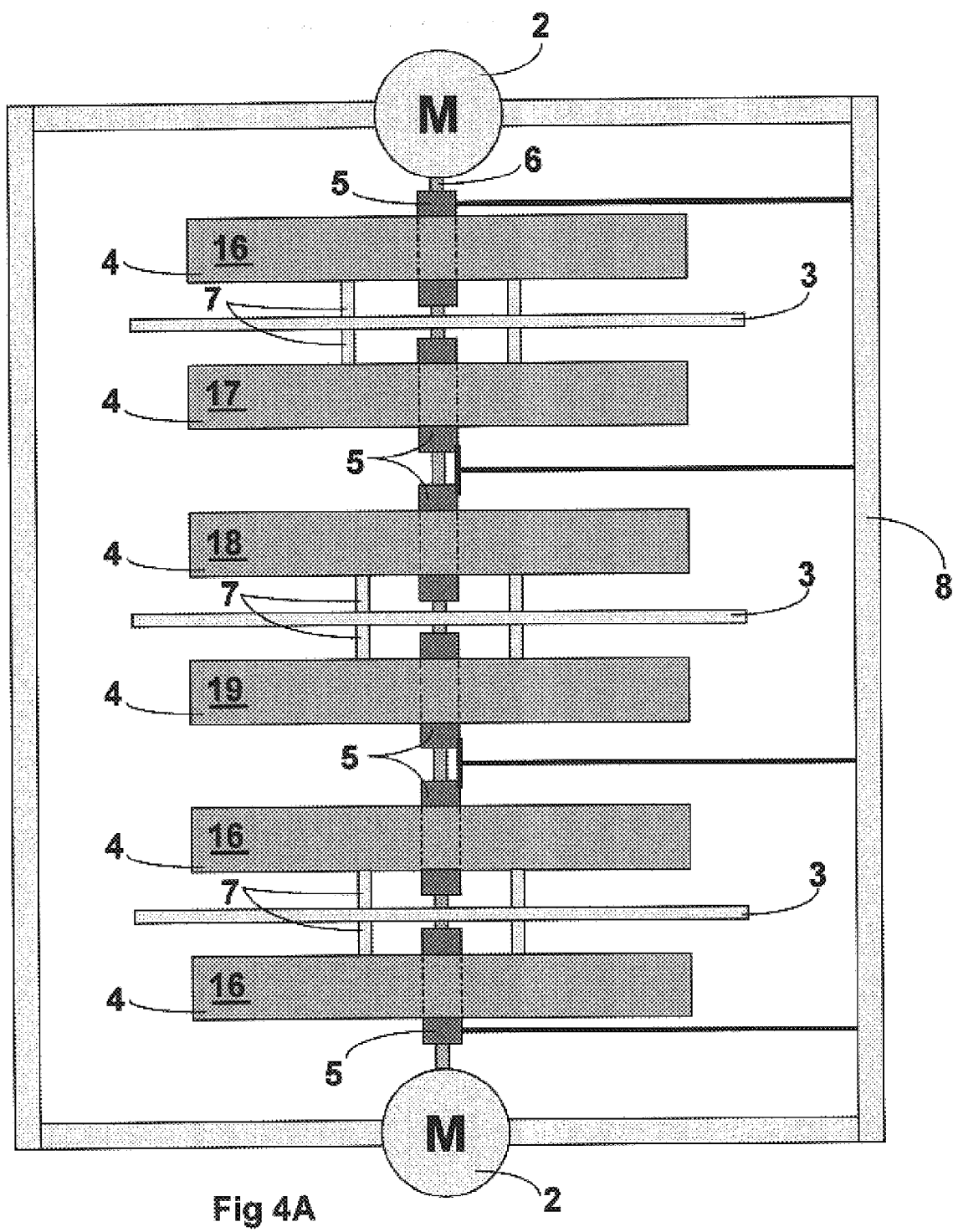

In FIG. 4A an alternative single spin axis configuration is illustrated that includes one spin axis 6 and is shown with an embodiment containing two motors 2, six weight-pair elements 4, six change-state elements 5, three spin-plane elements 3, six spin-plane frame elements 7, and one assembly frame element 8.

Figure 4B:
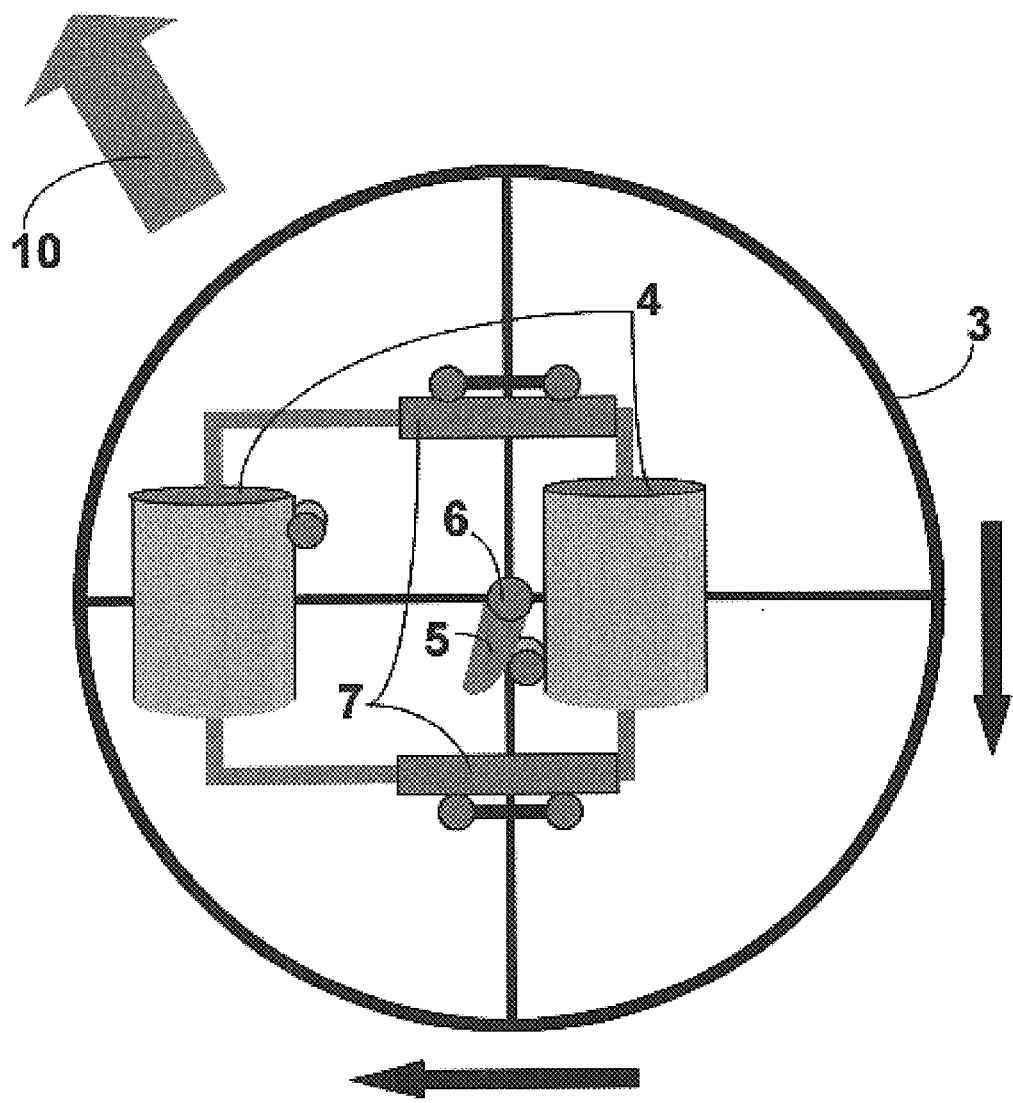
Figure 4C:
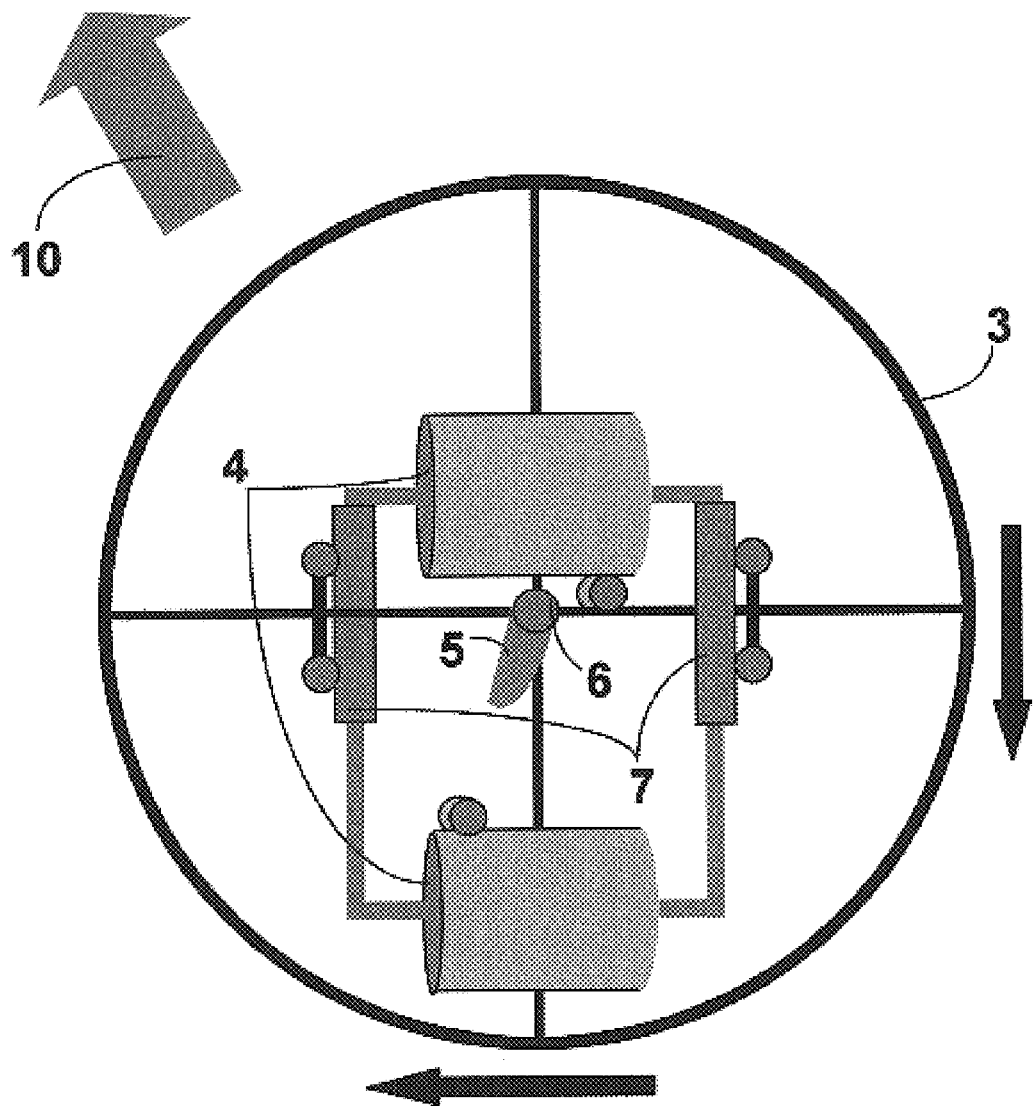
Figure 4D:
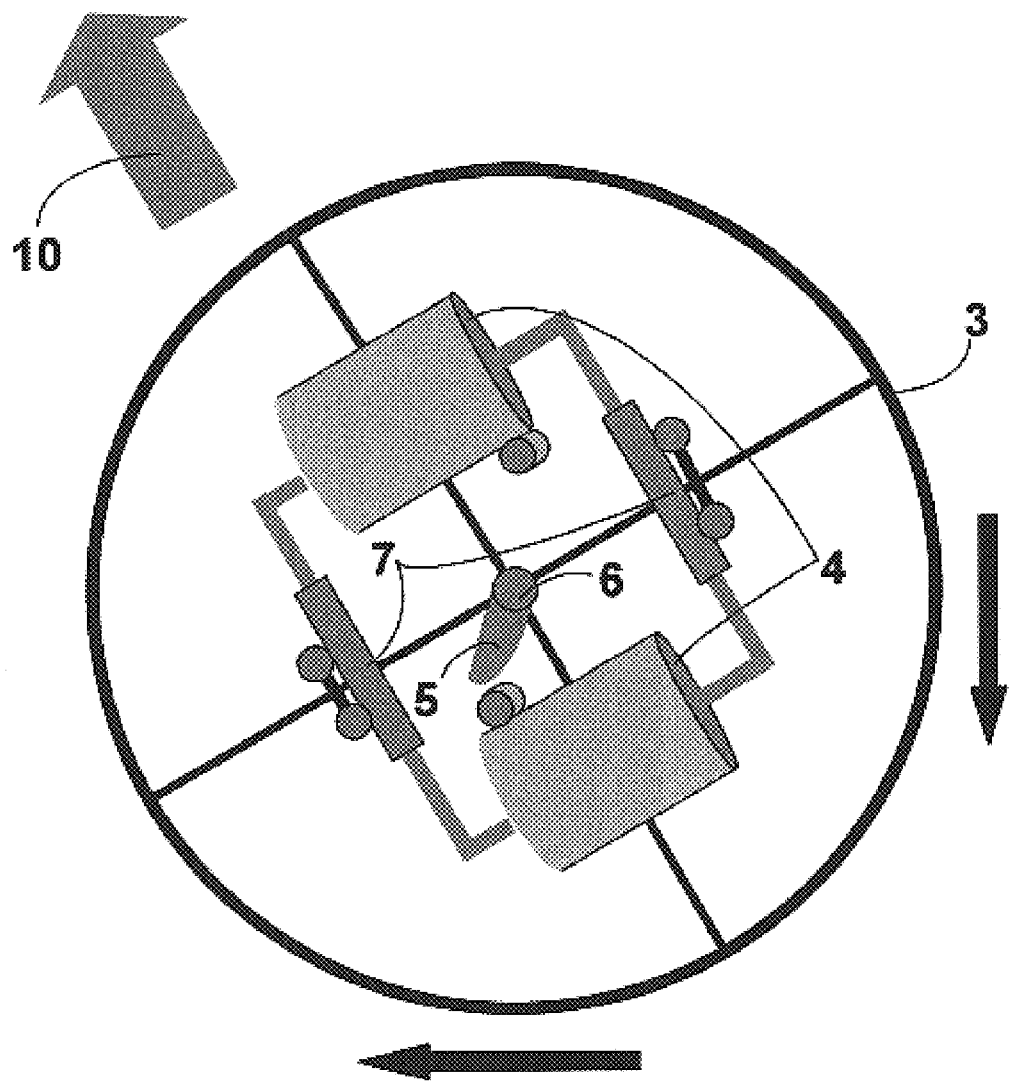
Figure 4E:
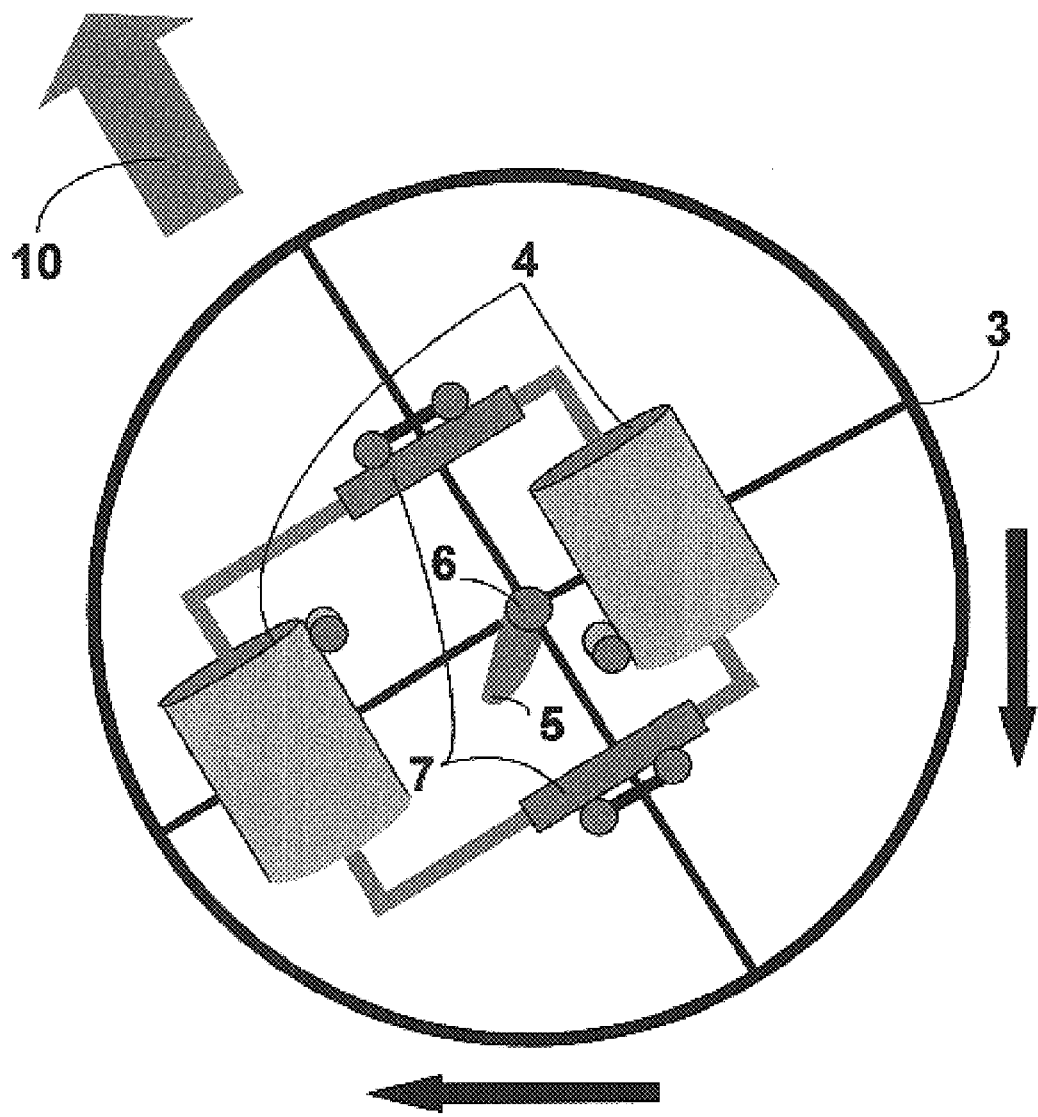
Figure 4F:
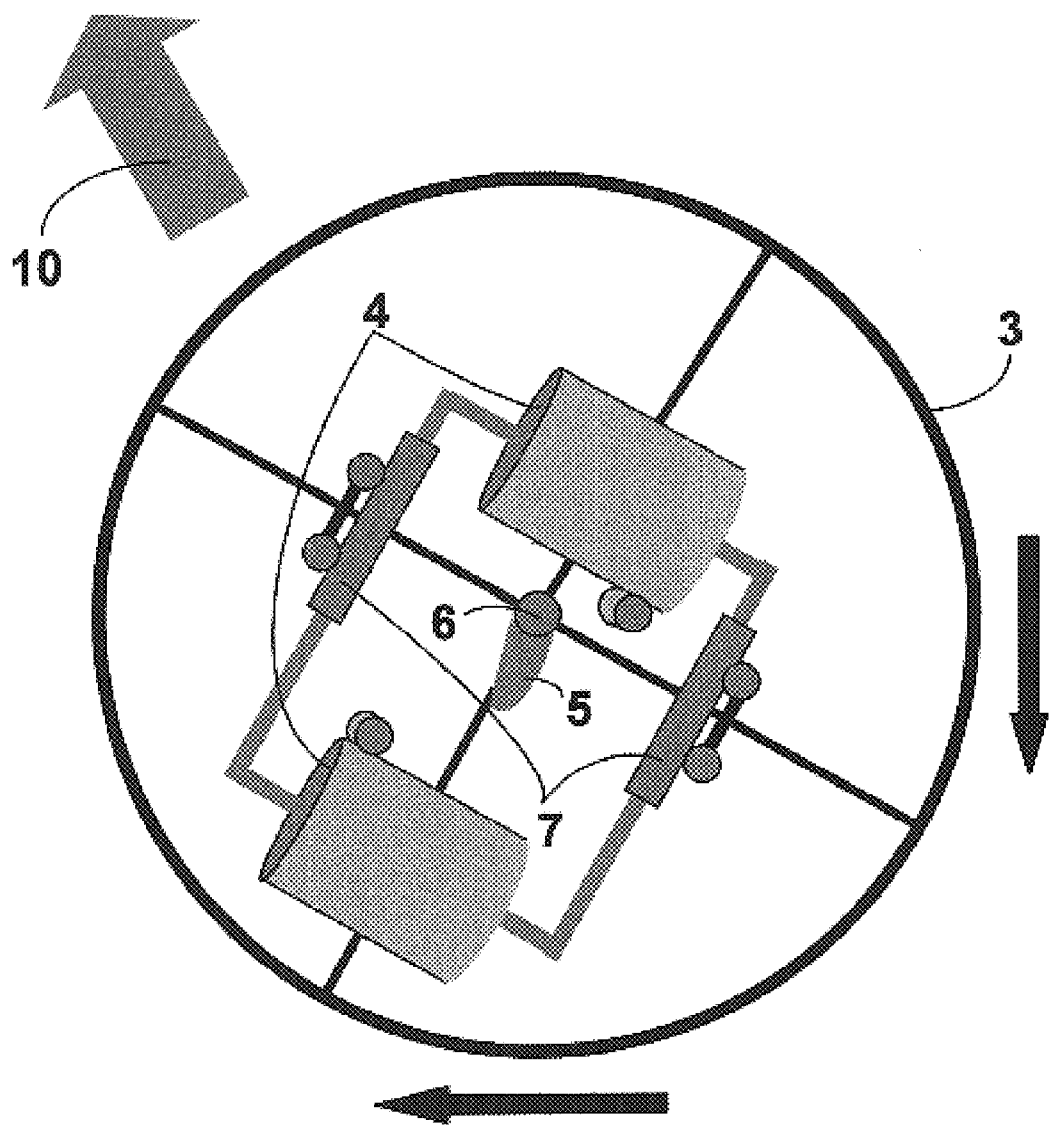
Figure 4G:
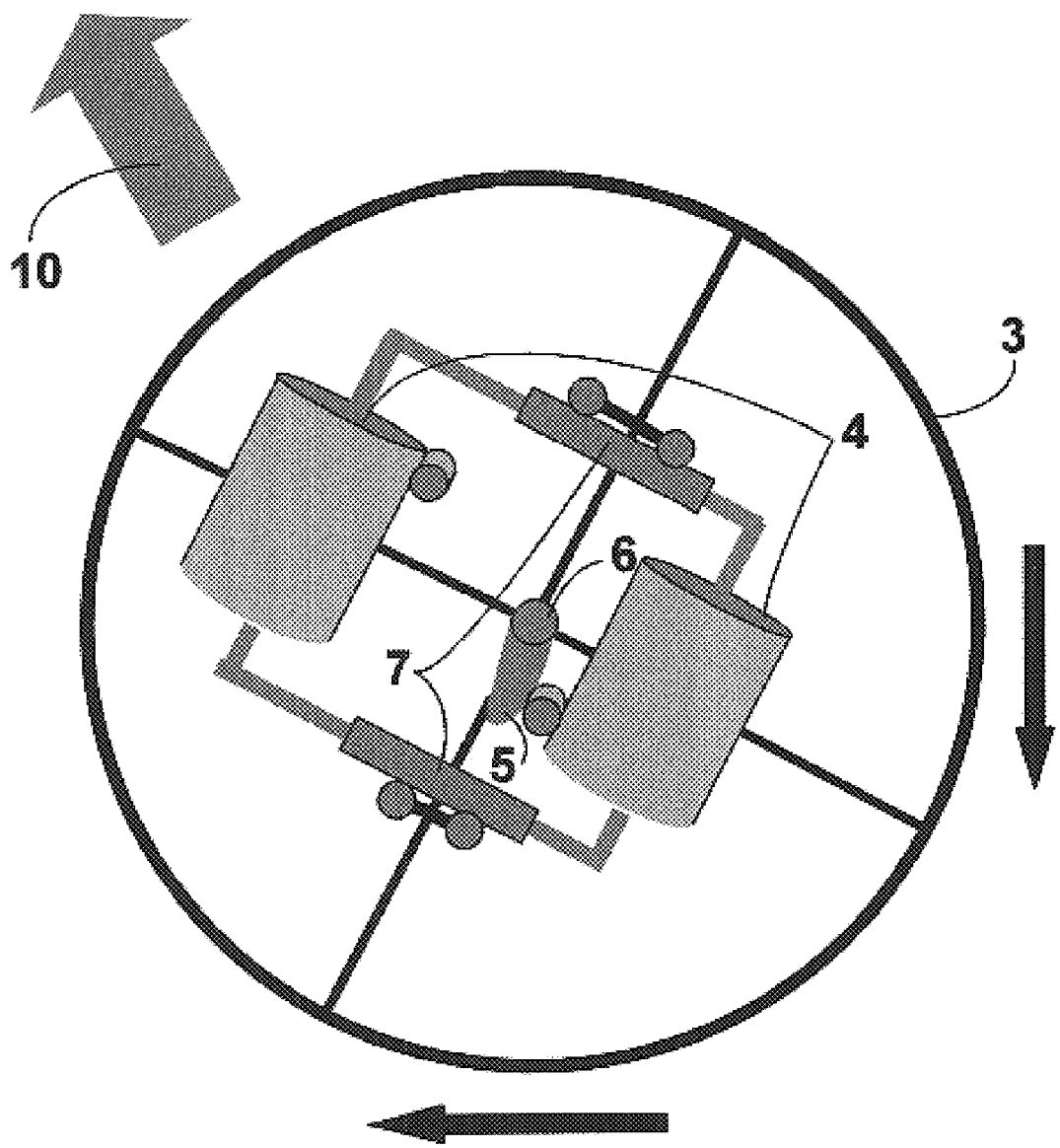

Six orientations of weight pairs on the spin planes are shown in FIGS. 4B, 4C, 4D, 4E, 4F, and 4G. In FIGS. 4B and 4C the orientation of the weight-pair elements 4 are on the top spin plane 3 with one weight pair 16 offset from the second weight pair 17 by 90 degrees. The change-state element 5 on the spin axis 6 is fixed to the same angle in all spin-plane elements. In FIGS. 4D and 4E, weight pairs are offset from the top spin plane orientation by +30 degrees. The weight pair 18 is offset by the second weight pair 19 by 90 degrees. In FIGS. 4F and 4G viewing the bottom spin plane, the weight pairs are offset from the top spin-plane orientation by −30 degrees. The weight pair 20 is offset from the second weight pair 21 by 90 degrees. The result is unidirectional thrust pulses occurring in the thrust direction 10 six times every 180 degrees and twelve times per revolution. At eight revolutions per second, a near continuous thrust from 96 unidirectional thrust pulses per second will occur.

Figure 5:
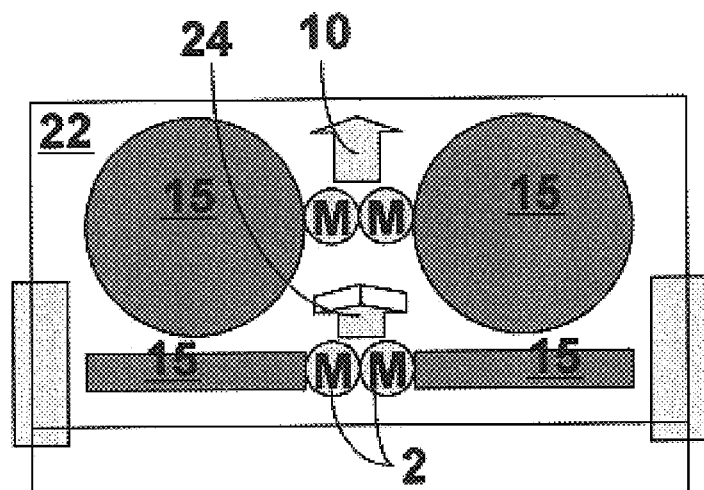
FIG. 5 is embodiment 3 containing multiple mirror image pairs of embodiment 1 assemblies attached to a vehicle oriented to provide thrust in directions in any plane and rotations about any axis.
Figure 5:
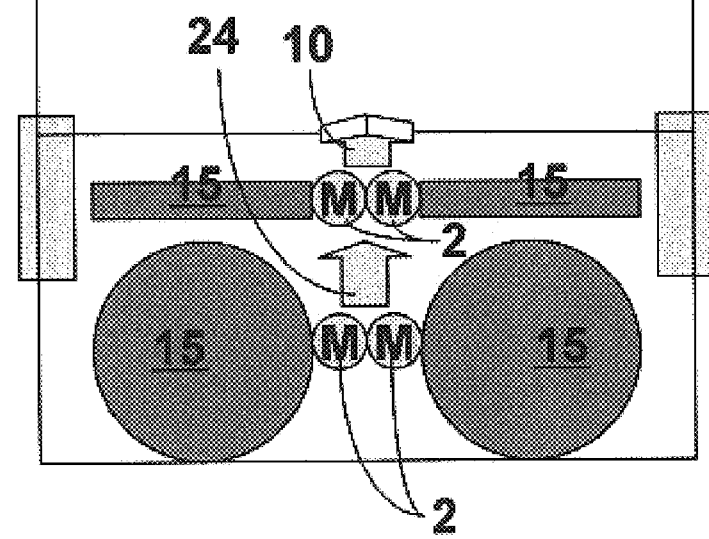

FIG. 5 The Passenger Vehicle Embodiment

In FIG. 5, embodiment 3 includes combinations of embodiment 2 to form mirror-image apparatuses oriented with spin planes in the horizontal and spin planes in the vertical, as in the apparatus 22. This results in right or left thrust, forward or reverse thrust, and up or down thrust. Four mirror-image pairs of embodiment 2 assemblies for the apparatus configuration in a passenger vehicle are illustrated. This apparatus provides control of a vehicle in all possible moving directions and rotational directions by adjusting the cam change-state elements 5 in the applicable assemblies. Computer control of all cam change-state elements is assumed to accomplish this. Two engine compartments 22 and four embodiment 2 assemblies provide a single apparatus capable of forward unidirectional thrust 10 and vertical thrust 24, as well as all combinations of pointing, rotational, and linear movement.

Figure 6:
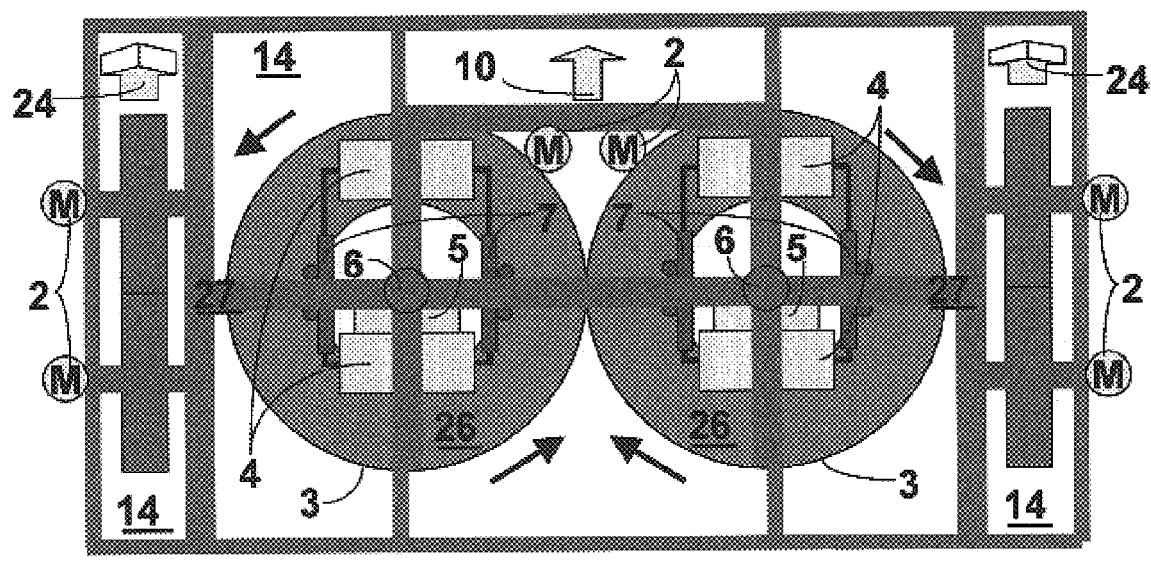
FIG. 6 is embodiment 4 containing multiple large-scale versions of embodiment 3 to create large-scale, unidirectional thrust capable of moving macroscopic objects, such as space stations in any direction in any plane and rotations about any axis.

FIG. 6 Space Station Embodiment

In FIG. 6 embodiment 4 is described using a large-scale version of embodiment 3 to create large-scale unidirectional thrust pulses to move a space station for orbit maintenance. In this large-scale application, two counter-rotating, manned laboratories 26 are accessible through an axis 6 and a system of tunnel frames 27. The embodiment 2 components for movement in the horizontal plane include two large-scale weight pairs 4 projected to be 20-foot width, electric motors 2 providing minimal rotation power to sustain synchronized rotation for one g centrifugal force for the human environment, a change-state element 5 to accelerate the weight-pair element 4 to its second stable unbalanced spin state, a spin-plane frame element 7, and the assembly frame element 8 supporting the central laboratories. Further, a combination of two other pairs of embodiment 2 assemblies 14 provides vertical unidirectional thrust 24. All unidirectional thrust directions, pointing angles, and roll control can be controlled by varying the change-state elements' angular direction on the spin axes. Computer software control is assumed, using conventional gyroscopic stabilization sensors, as reference.

Figure 7:
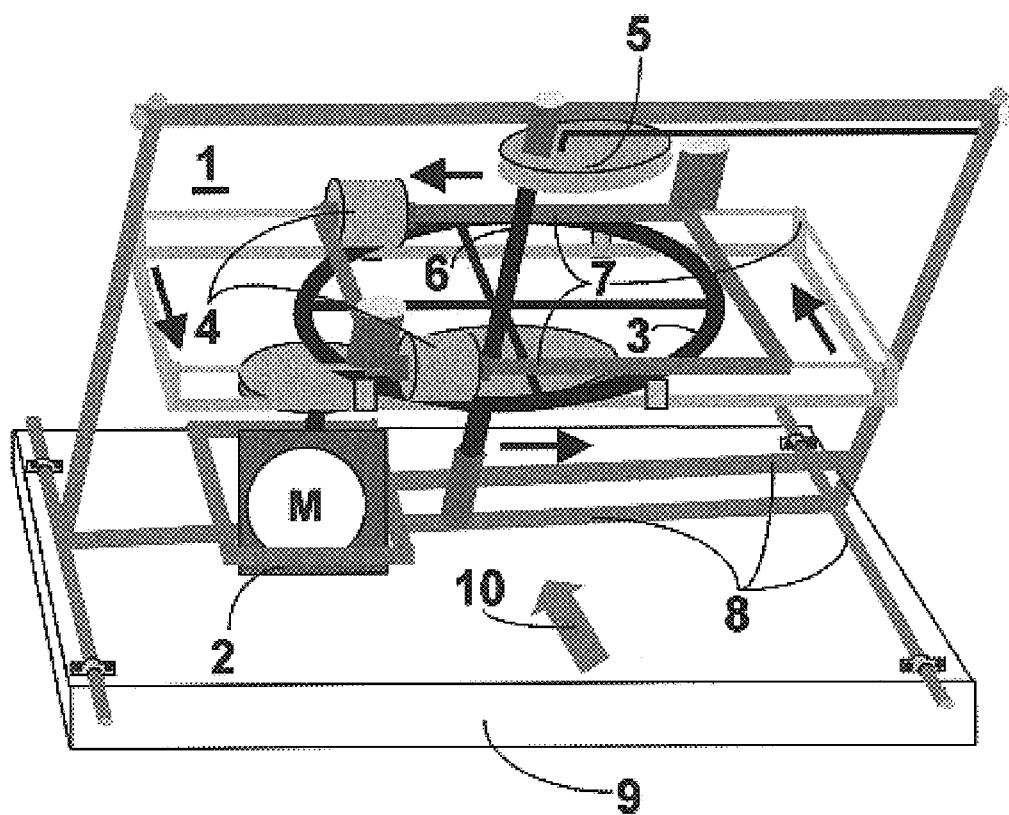
FIG. 7 is an alternate configuration of embodiment 1 with both weights at the spin-plane rim in the stable unbalanced weight states.

FIG. 7 Alternate Embodiment Configuration

FIG. 7 illustrates an alternate configuration of embodiment 1 unbalanced gyroscopic apparatus for producing unidirectional thrust. This alternate embodiment incorporates timed control of stable unbalanced weight states in an unbalanced gyroscopic apparatus changing weight positions slidably parallel to a spin-plane diameter path every 180 degrees of rotation. This action results in a change in momentum of two weights 4 on the spin plane 3 at the rim, further contributing to a thrust of the spin axis 6 in the thrust direction 10. This alternate embodiment of the invention includes the elements of the apparatus: a motor element 2, a spin-plane element 3, a weight-pair element 4, a change-state element 5, a spin axis element 6, a spin-plane frame element 7, and an assembly frame element 8. The assembly frame element is attached to a body to receive unidirectional thrust 9 in a thrust direction 10.

Conclusion, Ramifications, and Scope

Accordingly, the reader will see that the unbalanced gyroscopic apparatus of this invention can be used as a standalone transportation system for everything from personal wheelchairs and passenger vehicles to satellites and space stations, and even for moving larger space bodies such as a threatening asteroid. A gyroscopic system is a natural entity found in all universe space environments from whole galaxies to stars, planets, moons, asteroids, space stations, satellites, and the common toy one-inch gyroscope. This invention is a method to change these entities into self-propelling bodies capable of producing unidirectional thrust for movement in any direction through any local space gravity environment requiring minimum additional energy.

I claim:

1. An unbalanced gyroscopic apparatus for producing unidirectional thrust comprising:
   a) A rotational motor element;
   b) A spin axis element;
   c) A spin-plane element comprising:
      i) A circular plane attached to said spin axis element at 90 degrees; and
      ii) A radius defined as the distance from the center of said spin axis element to the rim of said spin-plane element;
   d) A weight-pair element comprising:
      i) Two equal weights attached slidably to two linear shafts parallel to the spin-plane diameter and fixed to said spin-plane element;
      ii) A frame attaching the weights and linear shafts to said spin-plane element;
      iii) A first stable unbalanced weight state with the two weights positioned to form a net weight unbalance on the first side of said spin axis element; and
      iv) A second stable unbalanced weight state with the two weights positioned to form a net weight unbalance on the second side of said spin axis element;
   e) A change-state element comprising:
      i) A change-state actuator to force the weights from the first stable unbalanced weight state to the second stable unbalance weight state every 180 degrees of rotation relative to a fixed frame of reference;
      ii) The said change-state actuator to urge the weight pair slidably parallel to the spin-plane diameter from the first stable unbalanced weight state to the second stable unbalanced weight state; and
      iii) A bracket connected to said change-state actuator that can change the angle of said change-state element relative to a fixed frame of reference around said spin axis element;
   f) A spin-plane frame element interconnecting said weight-pair element and said spin-plane element slidably wherein said weight-pair element movement is constrained to be parallel to a diameter of the attached said spin-plane element; and
   g) An assembly frame element interconnecting said rotational motor element, said spin axis element, and said change-state element.

2. An unbalanced gyroscopic apparatus for producing unidirectional thrust of claim 1 comprising said change-state element initial contact with the first weight at 0 degrees rotation relative to a fixed frame of reference, said change-state element urging said weight-pair element slidably parallel to said spin-plane element diameter to move said weight-pair element to change said weight-pair element from the first stable unbalanced weight state to the second stable unbalanced weight state on said spin-plane element before 180 degrees of rotation relative to a fixed frame of reference.

3. An unbalanced gyroscopic apparatus for producing unidirectional thrust of claim 2 comprising said weight-pair element release by said change-state element, creating a period of free fall parallel to the diameter of said spin-plane element to a stop point at the second stable unbalanced weight state prior to 180 degrees of rotation angle relative to a fixed frame of reference.

4. An unbalanced gyroscopic apparatus for producing unidirectional thrust of claim 1 comprising a bracket attached to said change-state element that is adjustable to cause the angle of the unidirectional thrust to change to any direction in the plane of said spin-plane element.

5. An unbalanced gyroscopic apparatus for producing unidirectional thrust of claim 1 comprising said assembly frame element that induces all thrust of said spin axis element onto a body to receive unidirectional thrust.

6. An unbalanced gyroscopic apparatus for producing unidirectional thrust comprising:
   a) At least one rotational motor element;
   b) A spin axis element;
   c) At least one spin-plane element comprising:
      i) A circular plane attached to said spin axis element at 90 degrees; and
      ii) A radius defined as the distance from the center of said spin axis element to the rim of said spin-plane element;
   d) At least one weight-pair element comprising:
      i) Two equal weights attached slidably to two linear shafts parallel to said spin-plane diameter and fixed to said spin-plane element;
      ii) A frame attaching the weights and linear shafts to said spin-plane element;
      iii) A first stable unbalanced weight state with the two weights positioned to form a net weight unbalance on the first side of said spin axis element; and
      iv) A second stable unbalanced weight state with the two weights positioned to form a net weight unbalance on the second side of said spin axis element;
   e) At least one change-state element comprising:
      i) A change-state actuator to force the weights from the first stable unbalanced weight state to the second stable unbalance weight state every 180 degrees of rotation relative to a fixed frame of reference;
      ii) The said change-state actuator to urge the weight pair slidably parallel to said spin-plane element diameter from the first stable unbalanced weight state to the second stable unbalanced weight state; and
      iii) A bracket connected to said change-state actuator that can change the angle of said change-state element relative to a fixed frame of reference around said spin axis element;
   f) At least one spin-plane frame element interconnecting each said weight-pair element and its said spin-plane element slidably wherein said weight-pair element movement is constrained to be parallel to a diameter of said spin-plane element; and
   g) An assembly frame element interconnecting said rotational motor elements, said spin axis elements, and said change-state elements.

7. An unbalanced gyroscopic apparatus for producing unidirectional thrust of claim 6 comprising said change-state element initial contact with the first weight at 0 degrees of rotation relative to a fixed frame of reference, said change-state element urging said weight-pair element slidably parallel to said spin-plane element diameter to move said weight-pair element to change said weight-pair element from the first stable unbalanced weight state to the second stable unbalanced weight state on said spin-plane element before 180 degrees of rotation relative to a fixed frame of reference.

8. An unbalanced gyroscopic apparatus for producing unidirectional thrust to a body of claim 7 comprising said weight-pair element release of contact by said change-state element, creating a period of free fall parallel to the diameter of said spin-plane element to a stop point at the second stable unbalanced weight state on said spin-plane element prior to the rotation angle of 180 degrees relative to a fixed frame of reference.

9. An unbalanced gyroscopic apparatus for producing unidirectional thrust of claim 6 comprising a bracket attached to said change-state element that is adjustable to cause the angle of the unidirectional thrust to change to any direction in the plane of said spin-plane element.

10. An unbalanced gyroscopic apparatus for producing unidirectional thrust of claim 6 comprising said assembly frame element that induces all thrust of said spin axis element onto said body to receive unidirectional thrust.

11. An unbalanced gyroscopic apparatus for producing unidirectional thrust comprising:
a) An even number of rotational motor elements;
b) An even number of spin axis elements each comprising:
   i) A first spin axis element that is a mirror image and is counter rotating relative to a second spin axis element;
   ii) The said first spin axis element interconnected with said second spin axis element wherein said first spin axis element is in the same plane as said second spin axis element; and
   iii) The said first spin axis element interconnected with said second spin axis element wherein all change-state events during counter rotations are synchronized;
c) An even number of spin-plane elements each comprising:
   i) A first circular plane attached to said first spin axis element at 90 degrees;
   ii) A second circular plane attached to said second spin axis element at 90 degrees; and
   iii) A radius on each circular plane defined as the distance from the center of the attached said spin axis element to the rim of said spin-plane element;
d) An even number of weight-pair elements each comprising:
   i) Two equal weights attached slidably to two linear shafts parallel to the spin-plane diameter and fixed to said spin-plane element;
   ii) A frame attaching the weights and linear shafts to said spin-plane element;
   iii) A first stable unbalanced weight state with the two weights positioned to form a net weight unbalance on the first side of said spin axis element; and
   iv) A second stable unbalanced weight state with the two weights positioned to form a net weight unbalance on the second side of said spin axis element;
e) An even number of change-state elements each comprising:
   i) A change-state actuator to force the weights from the first stable unbalanced weight state to the second stable unbalanced weight state every 180 degrees of rotation relative to a fixed frame of reference;
   ii) The said change-state actuator to urge the weight pair slidably parallel to said spin-plane element diameter from the first stable unbalanced weight state to the second stable unbalanced weight state; and
   iii) A bracket connected to said change-state actuator that can change the angle of said change-state element relative to a fixed frame of reference around said spin axis element;
f) An even number of said spin-plane frame elements interconnecting said weight-pair elements and their respective said spin-plane elements; and
g) An assembly frame element interconnecting said rotational motor elements, said spin axis elements, and said change-state elements.

12. An unbalanced gyroscopic apparatus for producing unidirectional thrust of claim 11 comprising said change-state element initial contact with the first weight at 0 degrees rotation relative to a fixed frame of reference, said change-state element urging of said weight-pair element slidably parallel to said spin-plane element diameter large enough to move said weight-pair element beyond the halfway point to change said weight-pair element from the first stable unbalanced weight state to the second stable unbalanced weight state on the respective said spin-plane elements.

13. An unbalanced gyroscopic apparatus for producing unidirectional thrust of claim 12 comprising said weight-pair element release by said change-state element, creating a period of free fall along the diameter of said spin-plane element to a stop point at the second stable unbalanced weight state prior to 180 degrees of rotation relative to a fixed frame of reference.

14. An unbalanced gyroscopic apparatus for producing unidirectional thrust of claim 11 comprising a bracket attached to each said change-state element that is adjustable to cause the angle of the unidirectional thrust to change to any direction in the plane of the attached said spin-plane element.

15. An unbalanced gyroscopic apparatus for producing unidirectional thrust of claim 11 comprising said assembly frame element that induces all thrust of said spin axis element onto a body to receive unidirectional thrust.

* * * * *